United States Patent [19]

Hankins

[11] Patent Number: 4,648,950
[45] Date of Patent: Mar. 10, 1987

[54] CR-39 TRACK ETCHING AND BLOW-UP METHOD

[75] Inventor: Dale E. Hankins, Livermore, Calif.

[73] Assignee: The United States of America as represented by the United States Department of Energy, Washington, D.C.

[21] Appl. No.: 786,993

[22] Filed: Oct. 15, 1985

[51] Int. Cl.$^4$ .............................................. C25F 3/02
[52] U.S. Cl. ............................ 204/129.4; 204/129.55; 204/129.75
[58] Field of Search ............ 204/129.4, 129.55, 129.75

[56] References Cited

U.S. PATENT DOCUMENTS 3,303,085 2/1967 Price et al. ................. 204/129.55 X
4,455,200 6/1984 Okamoto ..................... 204/129.4 X

OTHER PUBLICATIONS

L. Tommasino et al., "A New Etching Technique for Damage Track Detectors", *Radiation Effects*, vol. 20, pp. 253–255, 1973.
Al-Najjar, S. A. R. et al., Electrochemical Etching of CR-39 Plastic: Applications to Radiation Dosimetry, *Nuclear Tracks*, vol. 3, pp. 169–183, 1979.
Tommasino, et al., "Different Etching Processes of Damage Track Detectors for Personnel Neutron Dosimetry", Nuclear Tracks and Radiation Measurements, vol. 8, No. 1–4, pp. 335–339 (1984).

*Primary Examiner*—Donald R. Valentine
*Attorney, Agent, or Firm*—Michael B. K. Lee; Clifton E. Clouse, Jr.; Judson R. Hightower

[57] ABSTRACT

This invention is a method of etching tracks in CR-39 foil to obtain uniformly sized tracks. The invention comprises a step of electrochemically etching the foil at a low frequency and a "blow-up" step of electrochemically etching the foil at a high frequency.

11 Claims, 2 Drawing Figures

CR-39 TRACK ETCHING AND BLOW-UP METHOD

The invention described herein was made at the Lawrence Livermore National Laboratory in the course of, or under Contract No. W-7405-ENG-48 between the U.S. Department of Energy and the University of California.

BACKGROUND OF THE INVENTION

The invention relates to track etching of CR-39, which would be useful in dosimetry.

CR-39, oxydi-2, 1-ethanediyl di-2-propenyl diester of carbonic acid, has been found to be very useful in the detection of nuclear radiation. Because CR-39 is sensitive to a broad energy spectrum, it is useful for dosimetry and diagnostic detectors.

When CR-39 is exposed to nuclear radiation, emitted particles such as neutrons, protons and alpha particles create damaged areas in the CR-39. The CR-39 is then etched so that the damaged areas etch faster and become holes or pits (tracks) which can be detected, usually by some optical means.

The first method of etching used for CR-39 was chemical etching. In one example of chemical etching, a CR-39 foil is placed in a 6.25N NaOH at 75° C. for 6 hours. The NaOH enlarges the pits and holes. Chemical etching also etches the foil surface. The rate at which the etchant removes the foil surface is called the surface etching rate. The rate at which the etchant widens the track is called the etching rate along the track. Because the rate at which the etchant deepens the track is small compared to the surface etching rate, as the surface of the foil is etched away, it approaches the bottom of the track, so that the track becomes less visible. So the largest track sizes obtainable for a given particle and the sensitivity of such detectors are limited by the etching rate along the track and the surface etching rate. This limits the size to which a track may be enlarged. Because this limit keeps the enlarged tracks optically small, the tracks are hard to distinguish from surface pitting, dust, scratches or other defects, which causes an inaccurate track count. The etch rate along the track is dependent on the linear energy transfer (L.E.T.) of the charged particle that originally caused the damage. Some of the tracks are shallow, while some of the lower L.E.T. tracks are deep. These deeper low L.E.T. tracks require a longer etching time before they can become optically visible. Etching for longer periods of time to increase the visibility of these deeper tracks will cause the surface to be etched so that it reaches the bottom of some of the shallower tracks. This causes those shallower tracks to disappear, which adds to the inaccuracy in the track count. This also limits the broad range of sensitivity that makes CR-39 desirable.

The next method used to etch CR-39 was electrochemical etching. FIG. 1 is a cross-sectional illustration of an apparatus used in electrochemical etching. The foil 10 is mounted between two solutions of an etchant. An electrode is immersed in each solution. The electrodes are attached to a high voltage function generator which produces an alternating voltage. The solutions are ionic, usually an aqueous solution of KOH. The high voltage function generator is used to apply an alternating voltage across the electrodes. It is not clearly understood how this process works, but the alternating voltage causes the etching rate of the tracks to be higher than the surface etching rate, which allows the track enlargement to go beyond the limit which controls chemical etching. Electrochemical etching causes microscopic breakdown trees which makes the tracks appear as stars. Details about this method appear in "A NEW ETCHING TECHNIQUE FOR DAMAGE TRACK DETECTORS," by L. Tommasino and C. Armellini in *Radiation Effects,* Volume 20, pp. 253–255 (1973), incorporated by reference herein. One set of parameters would be 30 wt. % KOH at 60° C. and an alternating potential of 1000 volts and a frequency from 10 to 100,000 Hz. Initially, frequencies in the kiloHertz range were used.

The electrochemical etching process is a two step process. The sub-microscopic, latent tracks are enlarged by conventional chemical etching in the electrochemical etching chamber until a needle shape track develops, filled with the conductive etch solution. Then the alternating voltage across the sample induces breakdown and development of the tree shaped void. As mentioned above, the chemical etch rate along the track is dependent on the L.E.T. of the charged particle that originally caused the damage. As a result, some tracks develop breakdown trees before other tracks. The tracks do not overlap because tree breakdown of one track suppresses nearby tree development of a nearby track. As a result rapid tree development of some tracks suppress the growth of other tracks. This will cause some of the tracks (tracks of lower L.E.T.) to go undetected, which will yield inaccurate counts.

S. A. R. Al-Najjar, R. K. Bull and S. A. Durrani in "ELECTROCHEMICAL ETCHING OF CR-39 PLASTIC: APPLICATIONS TO RADIATION DOSIMETRY," in *Nuclear Tracks,* Volume 3, pp. 169–183 (1979), incorporated by reference, mentions the above problem and describes electrochemical etching with a pre-etching step, which was the next etching technique used. In this pre-etching technique, the foil is chemically pre-etched with a etchant, under conditions chosen to selectively enlarge one type of track. The foil is then electrochemically etched to greatly enlarge the selected tracks. By pre-etching different pieces of foil differently a broad range of tracks can be enlarged, but because each pre-etching technique is selective to a narrow range of tracks, pre-etching techniques cannot enlarge a broad range of tracks on one piece of foil.

L. Tommasino, G. Zapparoli, P. Spiezia, R. V. Griffith, G. Espinosa in "DIFFERENT ETCHING PROCESSES OF DAMAGE TRACK DETECTORS FOR PERSONNEL NEUTRON DOSIMETRY," in *Nuclear Tracks and Radiation Measurements,* Volume 8, Nos. 1–4, pp. 335–339 (1984), incorporated by reference, introduced another method of etching. In their method, a CR-39 foil is electrochemically etched for 5 hours at 60° C. with an alternating electric field of 30 kV/cm rms and 50 Hz. The lower frequency causes slower tree development, which allows all of the tracks to have tree development. This technique allows a wide range of tracks to be enlarged.

A problem with electrochemical etching at a low frequency is that although all the tracks are enlarged, the etched tracks differ in size from extremely small to very large. This difference in sizes makes it very difficult to manually count the tracks, and it is even more difficult to automatically count the tracks using a scanner. This difficulty will result in an inaccurate count. In addition, it is more difficult to distinguish the smaller tracks from background like dust or scratches which also causes inaccurate counts.

A problem with chemical etching, high frequency electrochemical etching and pre-etching techniques is that they only enlarge a small range of tracks or enlarge the tracks to a nonuniform size.

To improve the accuracy of track counts and to decrease the time required to make a track count, there is a need for a metnod of enlarging a broad spectrum of tracks to a more uniform size.

SUMMARY OF THE INVENTION

A goal of the invention is to enlarge a broad spectrum of tracks in CR-39.

Another goal of the invention is to enlarge all of the enlarged tracks to a more uniform size.

Another goal of the invention is to provide a more accurate track count.

Another goal of the invention is to allow for a faster track count.

Another goal of the invention is to allow for an inexpensive and accurate track count by machine.

Another goal of the invention is to selectively enlarge tracks to a more uniform size, suppressing the enlargement of background scratches.

Other objects of the invention will become readily apparent to those skilled in the art from the following description and accompanying drawing.

The invention is a method for enlarging a broad spectrum of tracks to a uniform size. The invention comprises a low frequency electrochemical etching and then a blow up step which places a high frequency across the electrodes used for the electrochemical etching.

DETAILED DESCRIPTION OF INVENTION

Figure 1:
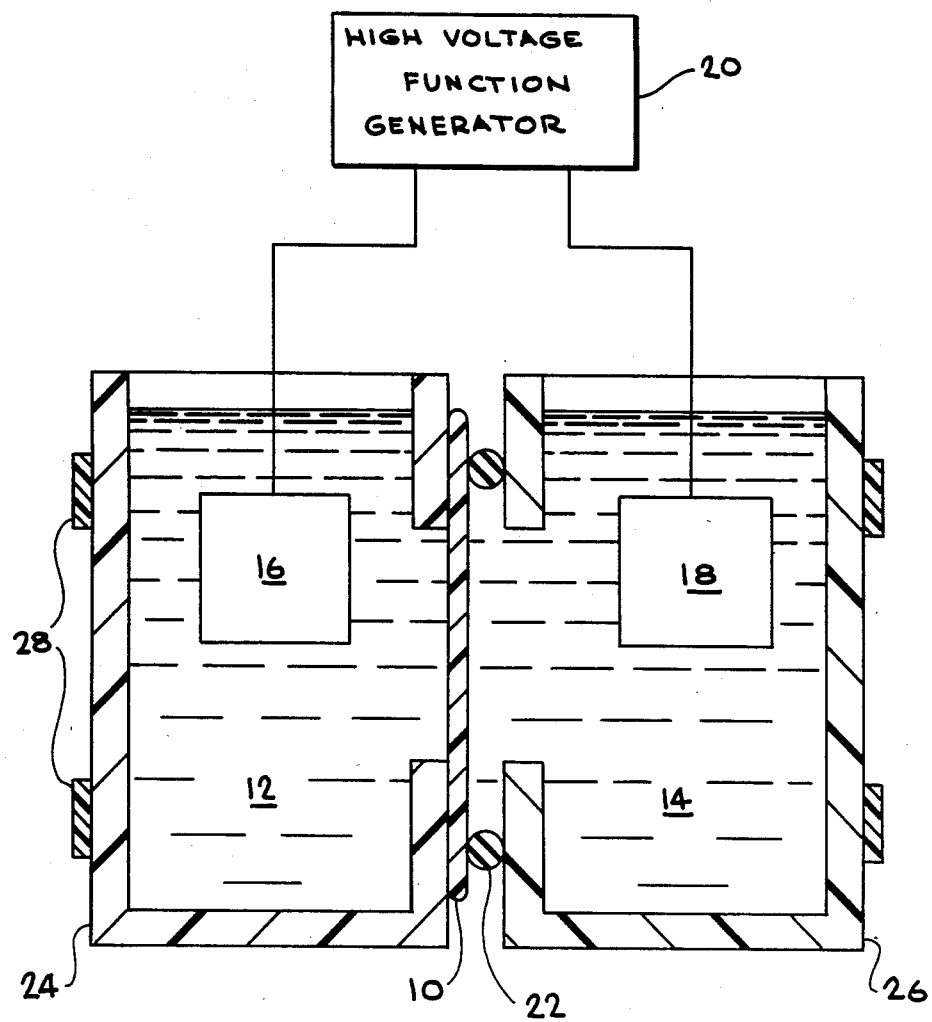
FIG. 1 illustrates a cross sectional view of an apparatus used for electrochemical etching.

FIG. 1 shows an apparatus which may be used to practice the invention. This and other similar devices were used in the prior art for electrochemical etching. Since the invention is a new method it may use the same apparatus used in the prior art. The CR-39 foil 10 is placed between two vessels 24 and 26. Vessel 24 contains ionic etchant solution 12, and vessel 26 contains ionic etchant solution 14, which may be the made of the same substance as solution 12. Foil 10 is placed between vessels 24 and 26 so that solution 12 is in contact with one side of the foil and solution 14 is in contact with the other side of the foil. O-ring 22 is used to keep the solutions from seeping out around the foil. Two electrodes 16 and 18 are placed in solutions 12 and 14. The electrodes 16 and 18 are attached to a high voltage function generator 20. Clamps 28 are plastic bands used to hold the apparatus together.

Figure 2:
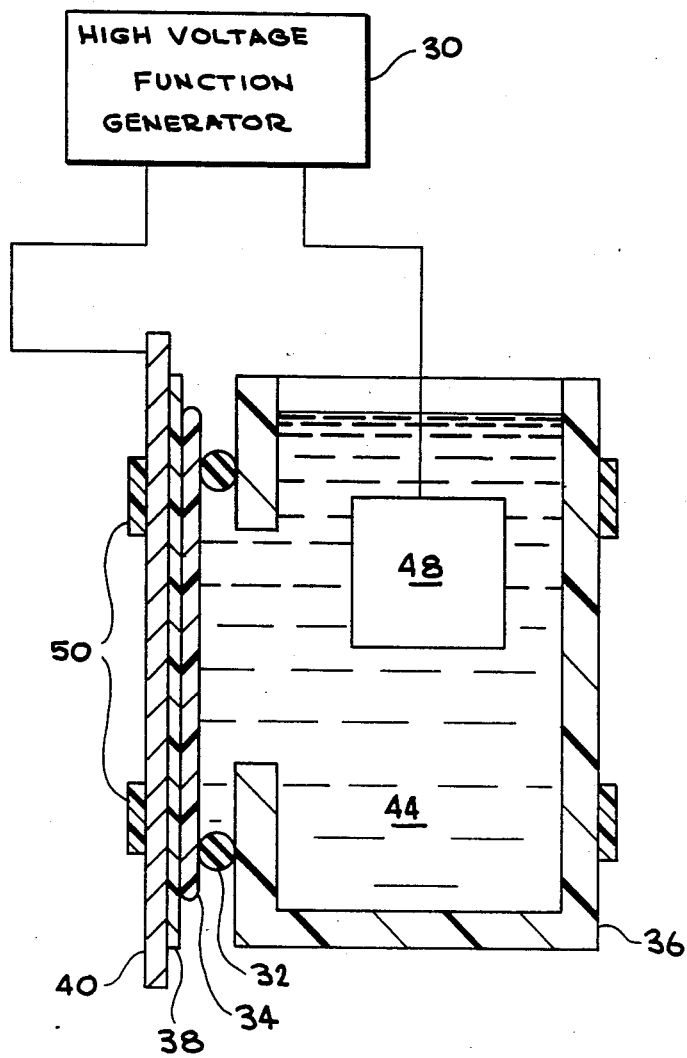
FIG. 2 illustrates a cross sectional view of another apparatus used for electrochemical etching.

FIG. 2 shows another device that may be used to practice the inventive method. Solution 44 is contained in vessel 36. The foil 34 is placed in contact with solution 44. O-ring 32 is used to keep solution 44 from leaking. A thin plastic film is placed on the side of foil 38 not in contact with solution 44. An electrode 40 is placed against plastic film 38 on the side away from foil 34. Another electrode 48 is placed in solution 44. Both electrodes are connected to a high voltage function generator 30. Clamps 50 are plastic bands used to hold the apparatus together.

The invention places the foil in the apparatus as shown or in any similar apparatus that can be used for electrochemical etching, using KOH as the etchant. First, the foil is etched using a conventional low frequency electrochemical etching technique having a frequency on the order of 50 Hz. This low frequency allows all of the tracks to develop tree breakdown. This low frequency prevents fast tree development so that more tracks may develop tree breakdown without suppression of tree breakdown from neighboring tracks as mentioned in the background. Initial high frequencies would promote fast tree development of some tracks which would suppress tree development of slower developing neighboring tracks. Next the high voltage function generator applies a frequency between 1 and 10 kiloHertz. This second step, called a "blow-up" step enlarges smaller tracks more quickly than the larger tracks making all of the tracks a more uniform size.

In the preferred embodiment the foil is first electrochemically etched in 6.5 N KOH for 5 hours at 60° C. with an alternating voltage field at 3000 volts with a frequency of 60 Hz. The etching step enlarges all of the tracks. The blow-up step follows the etching step and enlarges the smaller tracks so that all the tracks are uniformly large. In this step the foil is electrochemically etched in 6.5 N KOH for 30 minutes at 60° C. with an alternating voltage field at 2700 volts with a frequency of 2 kHz.

The resulting tracks can be quickly and accurately counted on a Biotran III made by New Brunswick Scientific Corporation.

While particular embodiments of the invention have been illustrated and/or described, modifications will become apparent to those skilled in the art, and it is intended to cover in the appended claims all such modifications as come within the spirit and scope of the invention.

I claim:

1. A method for enlarging to a uniform size tracks in a foil created by nuclear particles, comprising the steps of:
   providing a foil with tracks created by nuclear particles;
   electrochemically etching the foil at a low frequency; and
   electrochemically etching the foil at a high frequency so that the etched tracks are a uniform size.

2. A method for enlarging to a uniform size tracks in a foil as recited in claim 1, wherein the foil provided is CR-39.

3. A method for enlarging to a uniform size tracks in a foil as recited in claim 2, wherein the step of electrochemical etching at a low frequency precedes the step of electrochemically etching at a high frequency.

4. A method for enlarging to a uniform size tracks in a foil as recited in claim 3, wherein the step of electrochemical etching at a low frequency uses a frequency between 10 and 150 Hz.

5. A method for enlarging to a uniform size tracks in a foil as recited in claim 4, wherein the step of electrochemical etching at a high frequency uses a frequency between 1 and 15 kHz.

6. A method for enlarging to a uniform size tracks in a foil as recited in claim 5, wherein the step of electrochemically etching at a low frequency and the step of electrochemically etching at a high frequency have an alternating voltage of between 500 and 6000 volts.

7. A method for enlarging to a uniform size tracks in a foil as recited in claim 6, wherein the step of electrochemically etching at a low frequency and the step of electrochemically etching at a high frequency are carried out at a temperature on the order of 60° C.

8. A method for enlarging to a uniform size tracks in a CR-39 foil as recited in claim 7, wherein the step of electrochemically etching at a low frequency and the step of electrochemically etching at a high frequency use a solution of KOH with a concentration on the order of 6N.

9. A method for enlarging to a uniform size tracks in a CR-39 foil as recited in claim 8, wherein the step of electrochemically etching at a low frequency is carried out for a time period between 1 and 11 hours.

10. A method for enlarging to a uniform size tracks in a CR-39 foil as recited in claim 9, wherein the step of electrochemically etching at a low frequency is carried out for a time period between 5 and 80 minutes.

11. A method for enlarging to a uniform size tracks in a foil as recited in claim 10, wherein the electrochemical etching uses KOH as the etchant.

* * * * *